UNITED STATES PATENT OFFICE 2,230,748

IMPREGNATING SOLUTION FOR TEXTILES OR OTHER ORGANIC MATERIALS

Bror Olof Häger, Stockholm, Sweden, assignor to Bolideno Gruvaktiebolag, Stockholm, Sweden, a joint-stock company limited of Sweden No Drawing. Application March 14, 1938, Serial No. 195,919. In Sweden August 21, 1937

6 Claims. (Cl. 134—78.6)

Some of the aqueous solutions adapted for use in impregnating wood and similar substances contain bichromate, e.g. sodium bichromate. After the impregnation, this salt is gradually converted under reduction. Hereby, there is obtained in the cases herein intended a "fixation" of the preservation agents contained in the solution e.g. arsenious acid, compounds of zinc or copper.

However, these solutions cannot be employed for the purpose of impregnating textiles, because the bichromate attacks during its conversion the fibrous material in such a way that this latter is weakened. In wood substance no such weakening of the material occurs, as it contains ample amounts of easily oxidisable substances which react with the bichromate, and hence the fibres valuable for the strength are spared.

The present invention has for its object to render possible the use of solutions containing bichromate in impregnating fabrics and other vegetable matter. A characteristic feature of the invention consists therein that there is added to the solution a certain quantity of a gently reducing substance, with which the bichromate reacts upon its conversion in the fibres, instead of with the fibrous material. Said substance should have the property of being slowly oxidised in diluted solution but of being comparatively rapidly oxidised in concentrated solution, in order that no or only minor precipitates be formed in the impregnating solution, whereas the precipitation of the impregnating agents should proceed rapidly and completely when the textile material is allowed to dry after impregnation. To wit: upon drying, the solution penetrated into the fibres is concentrated, and the precipitation of the preserving substances takes place more and more rapidly.

The following statements give an example of a solution composed according to the present invention:

| | Grammes | |
|---|---|---|
| Arsenious acid | 10 | |
| Cadmium sulphate or other cadmium compound | 10 | Per litre of aqueous solution |
| Bichromate, e.g. alkali bichromate, such as sodium bichromate | 15 | |
| Sugar or sacchariferous substances, e.g. molasses, syrup, and the like | 20 | |

In this solution, the arsenious acid together with cadmium serves as a poison against rot funguses. Cadmium is added, however, in the first place on account of its action against moulds. The water soluble salts of zinc and copper may form a part of the solution.

As an example of the influence which the concentration possesses in connection with the precipitation of the impregnating agents, it may be stated that a solution composed according to the example given above is stable during 10 days, without any precipitate being formed. However, if it is concentrated 7 to 10 times, it will not be stable even during 24 hours.

The solution described above may, of course, be advantageously used also for impregnating other organic substances than textiles.

Having thus described my invention, I declare that what I claim is:

1. An aqueous impregnating solution for preservative treatment of textile fabrics comprising substantially 10 grams of arsenious acid, 10 grams of cadmium sulphate, 15 grams of an alkali metal bichromate and 20 grams of sugar per liter of solution.

2. An aqueous impregnating solution for preservative treatment of textile fabrics comprising substantially 10 grams of arsenious acid, 10 grams of cadmium sulphate, 15 grams of an alkali metal bichromate and 20 grams of a mild reducing agent soluble in water per liter of solution.

3. An aqueous impregnating solution for preservative treatment of textile fabrics comprising substantially 10 grams of arsenious acid, 15 grams of an alkali metal bichromate and 20 grams of a mild reducing agent soluble in water per liter of solution.

4. An aqueous impregnating solution for preservative treatment of textile fabrics comprising substantially 10 grams of arsenious acid, 15 grams of alkali metal bichromate and 20 grams of sugar per liter of solution.

5. A solution according to claim 3 containing substantially 10 grams of a water-soluble salt of a metal from the class consisting of copper and zinc.

6. A solution according to claim 4 containing substantially 10 grams of a water-soluble salt of a metal from the class consisting of copper and zinc.

BROR OLOF HÄGER.

CERTIFICATE OF CORRECTION.

Patent No. 2,230,748. February 4, 1941.

BROR OLOF HÄGER

It is hereby certified that the name of the assignee in the above numbered patent was erroneously described and specified as "Bolideno Gruvaktiebolag" whereas said name should have been described and specified as --Bolidens Gruvaktiebolag--, as shown by the record of assignments in this office; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.